United States Patent [19]

Dudko et al.

[11] 3,832,098

[45] Aug. 27, 1974

[54] EPICYCLIC HYDROPNEUMATIC DRIVE WITH INTERNAL-MESH GEARING

[76] Inventors: Daniil Andreevich Dudko, pereulok Mechnikova, 3, kv. 7; Mikhail Danilovich Sur, ulitsa Vladimirskaya, 98, kv. 52; Grigory Bagradovich Asoyants, Bulvar Lesi Ukrainki, 2, kv. 16, all of Kiev, U.S.S.R.

[22] Filed: Feb. 23, 1972

[21] Appl. No.: 228,668

[52] U.S. Cl. .................. 418/63, 418/66, 418/186, 418/188
[51] Int. Cl. ............................................. F03c 3/00
[58] Field of Search .......... 418/54, 63, 66, 186–188

[56] References Cited
UNITED STATES PATENTS

| | | | |
|---|---|---|---|
| 1,693,302 | 11/1928 | Lavergne | 418/188 |
| 3,367,239 | 2/1968 | Takagi | 418/54 |

*Primary Examiner*—C. J. Husar
*Attorney, Agent, or Firm*—Holman & Stern

[57] ABSTRACT

An epicyclic hydropneumatic drive is disclosed which includes a stationary sun wheel ($b$) and a movable sun wheel ($a$) with internal toothing. The housing (1) of the drive is made integral with the stationary sun wheel ($b$). The planet pinion (2) having two tooth rims (c and d) meshes with the sun wheels ($a, b$). The rims ($c, d$) of the planet pinion (2) are isolated from each other by the fixed partition (4). The planet pinion (2) is loosely set on the eccentric journal (9) of the pinion carrier (H) to form by its tooth rim ($c$) together with the stationary sun wheel ($b$) an interteeth working space having two zones (A,B), said zones intercommunicating with the pipelines to let in and out the actuating medium. The pinion carrier (H) has a longitudinal passageway which is subdivided into two chambers (11,12) within the zone of intermeshing of the stationary sun wheel ($b$) with the tooth rim ($c$) of the planet pinion (2). The chambers are hermetically separated from each other and adapted to communicate with the respective zone of the interteeth working space.

4 Claims, 5 Drawing Figures

EPICYCLIC HYDROPNEUMATIC DRIVE WITH INTERNAL-MESH GEARING

BACKGROUND OF THE INVENTION

The present invention relates to the field of general machine-building and has particular reference to epicyclic hydropneumatic drives with internal-mesh gearing.

It is already known to use epicyclic hydropnematic drives with internal-mesh gearing, comprising a stationary and movable sun wheels with internal toothing. Both sun wheels mesh with a planet pinion having two tooth rims separated from each other by a fixed partition mounted in the planet cage. The planet pinion is loosely set on the eccentric journal of the planet carrier so as to form a working space confined between one of the planet pinion tooth rims and the stationary sun wheel, the space being subdivided into two zones that communicate respectively with the pipelines to let in and out the actuating medium.

In the drive use is made of end-face admission of the actuating medium to one of the zones of the interteeth working spaces (cf. USSR Author's certificate No. 221,871 of Apr. 23, 1968).

Such a hydropneumatic drive however features low hydraulic efficiency due to an incomplete filling of the tooth spaces of the wheels by the actuating medium which, in turn, results from centrifugal forces developed on the planet pinion, as well as due to the provision of packing on the rotating journal of the pinion carrier to separate from each other the actuating medium inlet and outlet pipelines.

In addition, the drive is of low service life due to high inertia forces applied to the planet pinion supports, these forces arising due to the centrifugal moment of inertia which results from the pinion carrier being out-of-banalce lengthwise, as well as due to a relatively small size of the pinion carrier bearing mounted in the drive output shaft.

Furthermore, the herein-discussed drive proves to be technologically ineffective and too complicated to assemble.

SUMMARY OF THE INVENTION

It is an object of the present invention to increase the hydraulic efficiency of the drive.

It is another object of the present invention to increase the service life of the drive.

It is an additional object of the present invention to simplify the construction of the drive, to make its production technology more effective and assembly procedure more convenient and simple.

In keeping with the afore-mentioned and other objects the essence of the present invention resides in the fact that the pinion carrier has a longitudinal passageway which is subdivided into two chambers within the zone of intermeshing of the stationary sun wheel with one of the planet pinion tooth rims, the chambers being hermetically separated from each other and each chamber being adapted to communicate with the respective zone of the interteeth working space.

Such a construction of the drive is instrumental in attaining a complete filling of the gear intertooth spaces with the actuating medium, this being due to radial admission of the latter from the drive center line towards the periphery and by virtue of centrifugal forces effective on the planet pinion. Because of this construction the hydraulic efficiency of the drive is substantially enhanced.

It is preferred that the pinion carrier longitudinal passageway be in communication with both zones of the interteeth working space via opposite ports in the wall of the pinion carrier, an annular space being provided between the carrier and the planet pinion and radial slots being provided in the tooth spaces of the planet pinion tooth rim.

This construction likewise results in an increased hydraulic efficiency of the drive due to a reduced path of the actuating medium to one of the zones of the interteeth working space and lower local hydraulic losses.

It is preferable to separate the longitudinal passageway of the pinion carrier with a partition positioned at an angle to the center line of the latter against and throughout the length of the pinion carrier ports.

This latter construction is responsible for an increased volumetric efficiency of the drive which is attainable due to a more complete filling of the tooth spaces of the gear wheels with the actuating medium, as well as for relieving the pinion carrier supports by a reduced axial component resulting from the pressure exerted by the actuating medium upon the pinion carrier face surface.

It is likewise preferred that an eccentric bushing be fitted onto the extension of the pinion carrier eccentric journal, the bushing having an amount of eccentricity equal to that of the pinion carrier and carrying a bearing support accommodated in an end-face recess of the output shaft.

This is conducive to an increased hydraulic efficiency and longer service life of the drive due to a larger-size bearing used in the pinion carrier.

The herein-disclosed hydropneumatic drive, according to the invention, finds effective application in welding equipment as the drive to feed welding wire in semi-automatic welding machines operating on the "pull" and "pull-push" principle. In addition, the present drive is widely applicable in a variety of other welding equipment and machinery such as plants, apparatus, fixtures and appliances, etc., wherever coolant liquid or gas is used and the welding equipment is to be operated at elevated temperatures.

The hydropneumatic drive proposed herein can likewise be used on a large scale in those branches of the machine-building industry where the drive must be compact, light in weight and feature low angular speed, stepless variation of the output shaft speed and high torque (as in the case of hydraulic- and pneumatic hand tools, devices for control and monitoring of technological processes, etc).

The present hydropneumatic drive, according to the invention, features a wide range of gear reduction ratios (20 to 10,000) as well as high hydraulic efficiency.

BRIEF DESCRIPTION OF THE DRAWINGS

Further objects and advantages of the present invention will be readily appreciated as the invention becomes more clearly understood by reference to the following detailed description of a number of exemplary embodiments when considered in conjunction with the accompanying drawings, wherein.

DETAILED DESCRIPTION OF PREFERRED EMBODIMENTS

Figure 3:
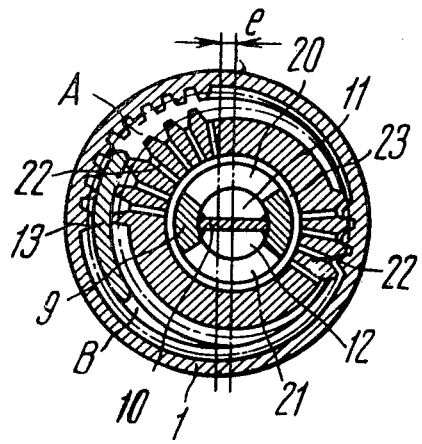
FIG. 3 is a section taken along line III—III in FIG. 2.
Figure 1:
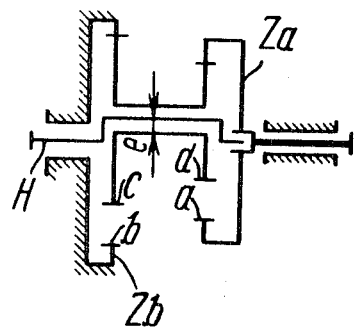
FIG. 1 shows a kinematic diagram of the hydropneumatic drive, according to the invention.

Now referring to FIG. 1, the gear reduction ratio of the present hydropneumatic drive, according to the kinematic diagram shown in that Figure, is found from the following general formula:

$$i_i = \frac{1}{1 - \frac{Z_b}{Z_c} \cdot \frac{Z_d}{Z_a}} = \frac{Z_c \cdot Z_a}{Z_c \cdot Z_a - Z_b \cdot Z_d},$$

where $Z_a$ stands for the number of teeth in the movable sun wheel $ar$;

$Z_b$ denotes the number of teeth in the stationary sun wheel $b$;

$Z_c$ designates the number of teeth in the rim $c$ of the planet pinion;

$Z_d$ symbolizes the number of teeth in the rim $d$ of the planet pinion.

By appropriately varying the number of teeth of the sun wheels, with the center distance of the mating wheels remaining unaffected, one can vary the gear reduction ratio of the drive in a reasonably wide range (from 10 to 10,000) which results in a substantially decreased angular speed of the output shaft speed and higher torque, accordingly.

Figure 2:
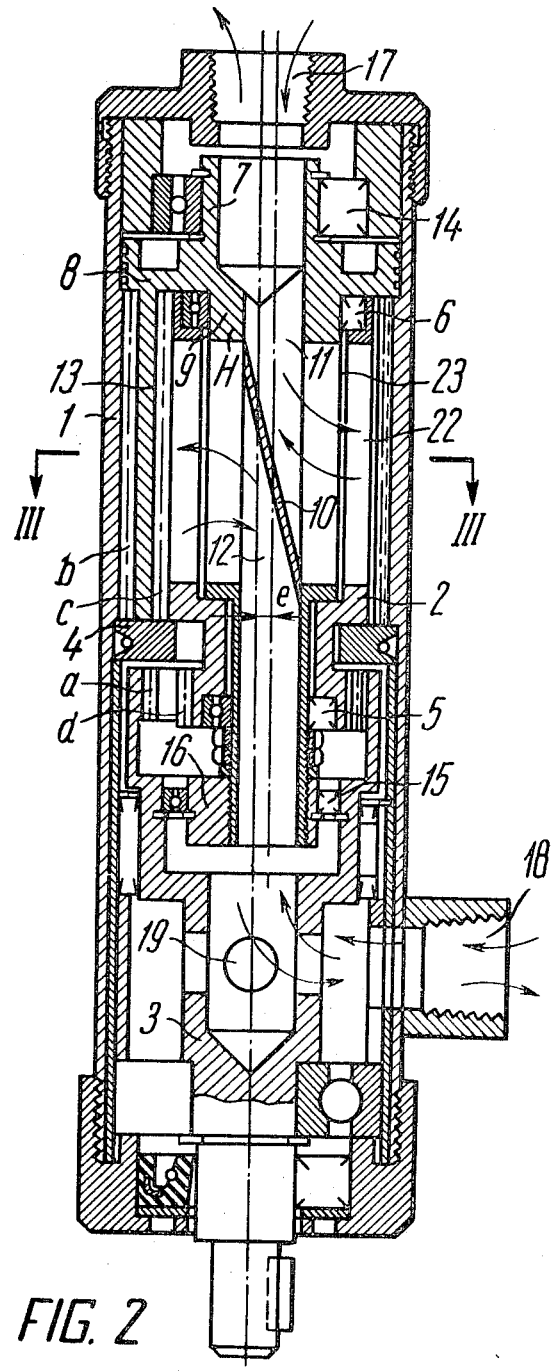
FIG. 2 is a schematic longitudinal-section view of the hydropneumatic drive, according to the invention.

A housing 1 (FIG. 2) of the hydropneumatic drive is made integral with the stationary sun wheel $b$. The tooth rim $c$ of a planet pinion 2 meshes with the stationary sun wheel $b$, while the other tooth rim $d$ of the planet pinion 2 meshes with the movable sun wheel $a$ which is made integral with an output shaft 3 of the drive. A fixed partition 4 is provided in between the rims $c$ and $d$ of the planet pinion 2; the latter is loosely set, by means of antifriction bearings 5 and 6, on the pinion carrier H which includes a concentric journal 7, a flange 8 and an eccentric journal 9.

A through passageway is provided in the eccentric journal 9 along the longitudinal axis thereof, the passageway being subdivided into two chambers 11 and 12 by an inclined partition 10.

The pinion carrier H has a crescent-shaped tongue 13 which enters the interteeth working space to divide it into two zones A and B. The pinion carrier H rests upon two antifriction bearings 14 and 15, of which the bearing 14 is set on the concentric journal 7 of the pinion carrier H and is accommodated inside the drive housing 1, whereas the bearing 15 is fitted onto a bushing 16 and is located in an end-face recess of the output shaft 3. The bushing 16 features the amount of eccentricity $e$ equal to the amount of eccentricity $e$ of the pinion carrier H so that both amounts of eccentricity coincide with each other.

The housing 1 has holes 17 and 18 for the inlet and outlet pipe unions (not shown in the drawing). The output shaft 3 has lateral ports 19 to communicate with the hole 18.

To let in and out the actuating medium to or from the zones A and B, provision is made for ports 20 and 21 in the pinion carrier H and for radial slots 22 in the intertooth spaces of the rim c of the planet pinion 2. The ports 20 and 21 and the slots 22 are equal in width which is the same as the face width of the teeth of the rim c of the planet pinion 2 and the length of the partition 10. A minimum annular gas 23 is provided in between the planet pinion 2 and the pinion carrier H.

The hydropneumatic drive proposed herein operates as follows: The actuating medium is pressure-fed through the hole 17 to the central chamber 11 of the pinion carrier H, flows through the port 20, the annular gap 23, the radial slots 22 into the zone A of the interteeth working space. It will be appreciated that only a small flow of fluid occurs to the gap 23, the bulk of the fluid flowing passing through the radial slots 22 in zone A. While in that zone the actuating medium is isolated from the zone B by virtue of a close contact of the intermeshed teeth of the planet pinion rim $c$ and the sun wheel $b$ minimum clearances between the tooth tip diameters of the sun wheel $b$ and the planet pinion rim $c$, as well as due to the provision of the tongue 13 of the pinion carrier H, the flange 8 and the partition 4. As a result, a pressure rise of the actuating medium is established within the zone A and a torque is developed on the pinion carrier H due to pressure differential of the actuating medium in the zones A and B, said torque being transmitted at a high gear ratio to the output shaft 3 of the drive by virtue of meshing the sun wheels $a$ and $b$ with the tooth rims $d$ and $c$, respectively.

The actuating medium transferred by the teeth of the planet pinion 2 from the zone A to the zone B, passes along the radial slots 22, the annular gap 23, the port 21, the chamber 12, the holes 19 and 18 for drainage.

With the actuating medium fed to the zone B, the direction of flow of the actuating medium is changed and the output shaft 3 reverses its rotation.

Figure 5:
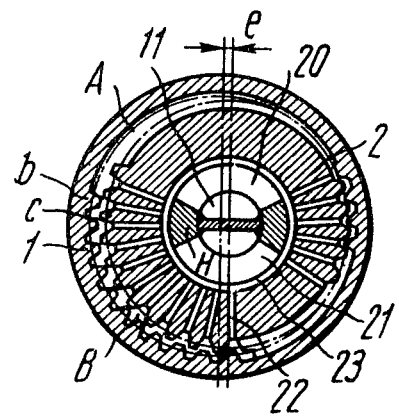
FIG. 5 is a section taken along line V—V in FIG. 4.
Figure 4:
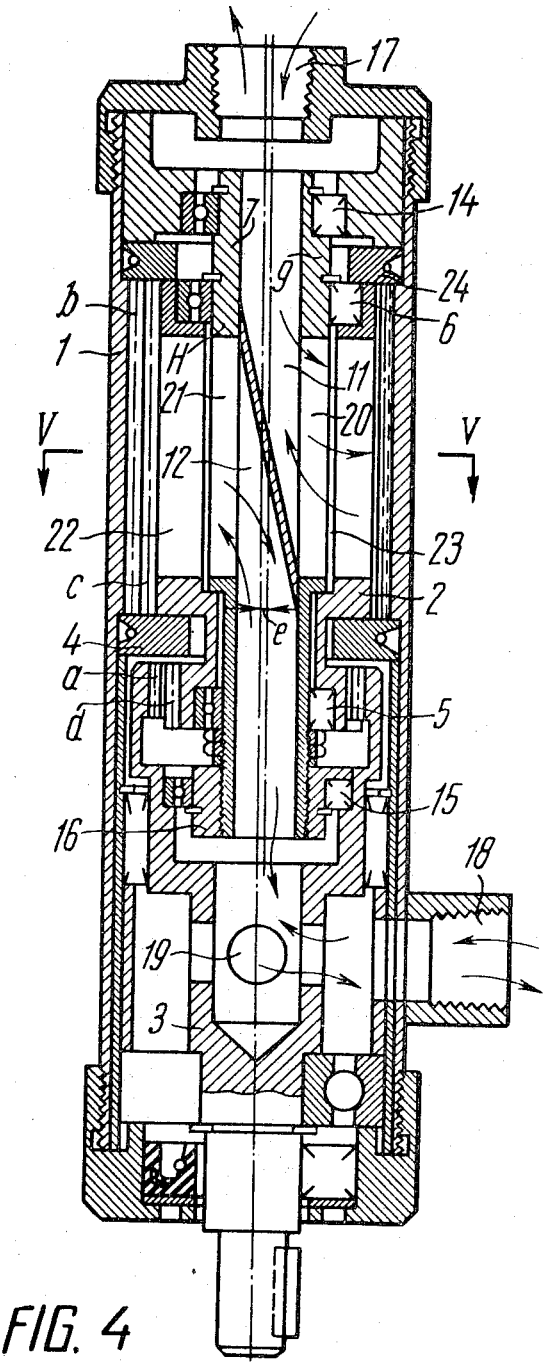
FIG. 4 is a longitudinal-section view of another embodiment of the hydropneumatic drive, according to the invention.

Another embodiment of the hydropneumatic drive is illustrated in FIGS. 4 and 5, according to the invention.

This latter embodiment differs from the one disclosed hereinbefore in that the interteeth working space is subdivided into the zones A and B by virtue of a minimum clearance between the tooth tips of the sun wheel $b$ and the tooth rim $c$ (FIG. 5).

Thus, the zones A and B are separated from each other in the end-face direction by a split partition 24 made fast in the drive housing 1.

The operation of the hydropneumatic drive made according to the embodiment discussed above is similar to that set forth hereinbefore.

The epicyclic hydropneumatic drive with internal-mesh gearing, according to the invention, features a high gear ratio and combines the following functions: it transforms the energy of the actuating medium into rotary motion of the output shaft; substantially reduces the angular speed of the output shaft and increases torque thereon.

What is claimed is:

1. An epicyclic hydropneumatic drive with internal-mesh gearing and having an actuating medium, comprising: a stationary and a movable sun wheel having internal toothing; a planet pinion having two tooth rims adapted to mesh with said sun wheels; a fixed partition to separate said rims of said planet pinion from each other; an interteeth working space confined between the rim of said planet pinion and said stationary sun wheel, said space being subdivided into two zones substantially isolated from each other; pipelines to let in and out the actuating medium, adapted to communicate with said zones of said interteeth working space; a pinion carrier having an eccentric journal, said pinion carrier having a longitudinal passageway and carrying said planet pinion loosely set on said eccentric journal, said passageway being subdivided into two chambers within the zone of intermeshing of said stationary sun wheel with said tooth rim of said planet pinion, said chambers being hermetically separated from each other and each chamber being adapted to communicate with the said respective zone of said interteeth working space.

2. An epicyclic hydropneumatic drive as claimed in claim 1, wherein said chambers of said longitudinal passageway of said planet pinion are adapted to communicate with both of said zones of said interteeth working space via opposite ports provided in the wall of said pinion carrier, and radial slots being made in the tooth spaces of said planet pinion tooth rim.

3. An epicyclic hydropneumatic drive as claimed in claim 2 wherein said longitudinal passageway of said pinion carrier is separated by a partition positioned at an angle to the center line of said pinion carrier against and throughout the length of said ports in said pinion carrier.

4. An epicyclic hydropneumatic drive as claimed in claim 1 wherein fitted onto the extension of said eccentric journal of said pinion carrier is an eccentric bushing featuring an eccentricity equal to that of said pinion carrier, said bushing carrying a bearing support accommodated in an end-face recess of the output shaft.

* * * * *